United States Patent [19]
Thordarson

[11] Patent Number: 6,026,849
[45] Date of Patent: Feb. 22, 2000

[54] HIGH PRESSURE REGULATED FLOW CONTROLLER

[76] Inventor: Petur Thordarson, 18717 76th Ave. West, Suite F, Lynnwood, Wash. 98037

[21] Appl. No.: 09/119,383

[22] Filed: Jul. 20, 1998

Related U.S. Application Data

[60] Provisional application No. 60/087,521, Jun. 1, 1998.

[51] Int. Cl.[7] ........................................ G05D 7/01
[52] U.S. Cl. ...................... 137/501; 137/505.42; 137/613
[58] Field of Search ................................. 137/501, 505, 137/614, 505.42, 613

[56] References Cited

U.S. PATENT DOCUMENTS

| | | | |
|---|---|---|---|
| 4,015,626 | 4/1977 | Thordarson | 137/375 |
| 4,096,746 | 6/1978 | Wilson et al. | 137/501 |
| 4,210,171 | 7/1980 | Rikuta | 137/501 |
| 4,629,561 | 12/1986 | Shirato et al. | 137/501 |
| 5,329,966 | 7/1994 | Fenimore et al. | 137/501 |

*Primary Examiner*—Stephen M. Hepperle
*Attorney, Agent, or Firm*—Michael R. Schacht; Hughes & Schacht, P.S.

[57] ABSTRACT

A flow regulator having a first and second stages of regulation. The first stage is a pressure regulation stage that maintains the pressure within an intermediate chamber (formed by a series of interconnected passageways and cavities) within a predetermined range above the pressure in an outlet port. The second stage maintains the flow rate within a predetermined range about a target flow rate. Both stages sample the pressure in the outlet port and automatically adjust the flow of fluid to ensure that fluctuations in pressure at the inlet and outlet ports do not affect the flow rate. The flow rate is set and controlled by a piston and valve arrangement. The pressure is regulated by a similar piston and valve arrangement. A flexible membrane is used to allow pressures in one chamber to be transferred into a control signal that operates a control valve in another chamber. One or more of several types of control valves may be used depending upon such factors as the input pressure and the type of fluid being controlled. The controller can be easily manufactured using injected molded steel or plastic with minimal milling passageways after the molding process.

27 Claims, 6 Drawing Sheets

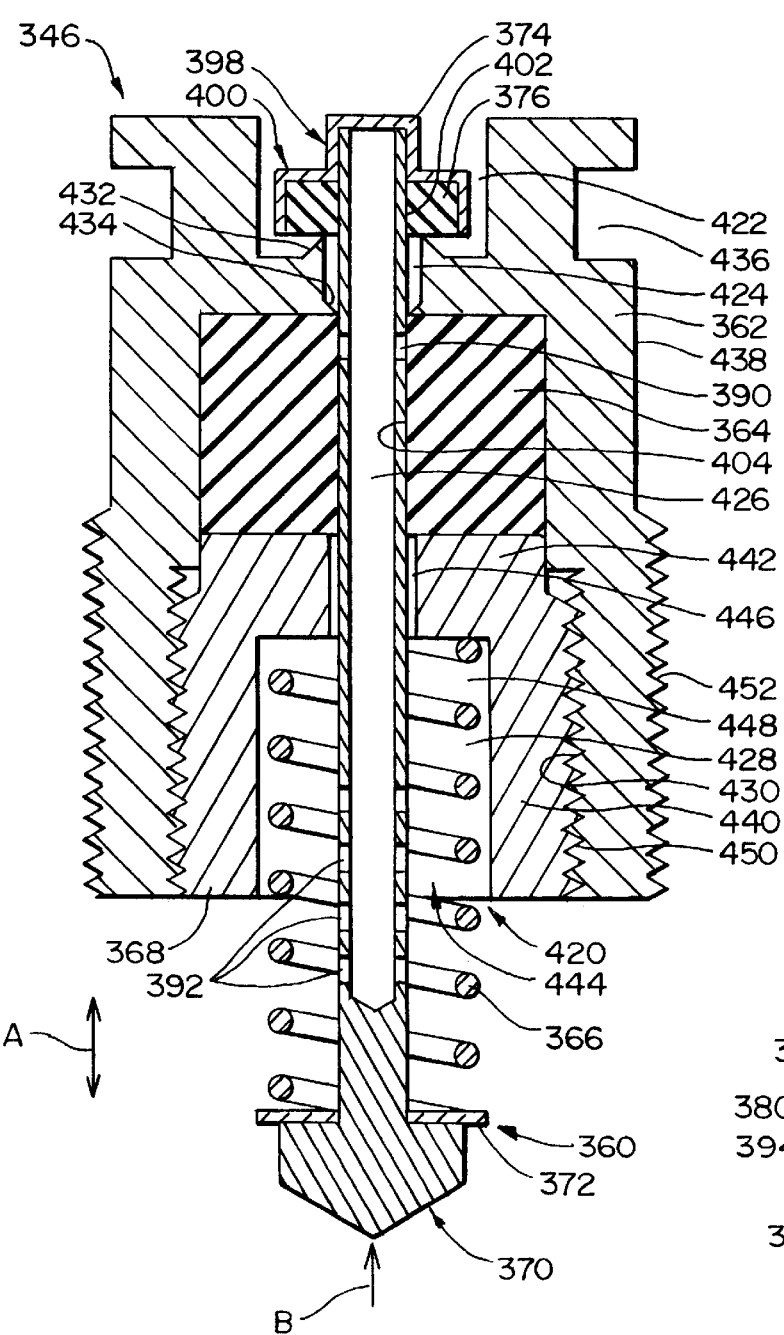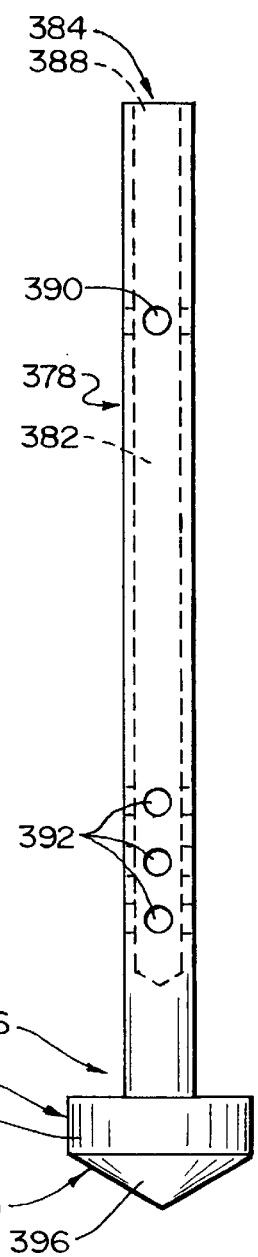

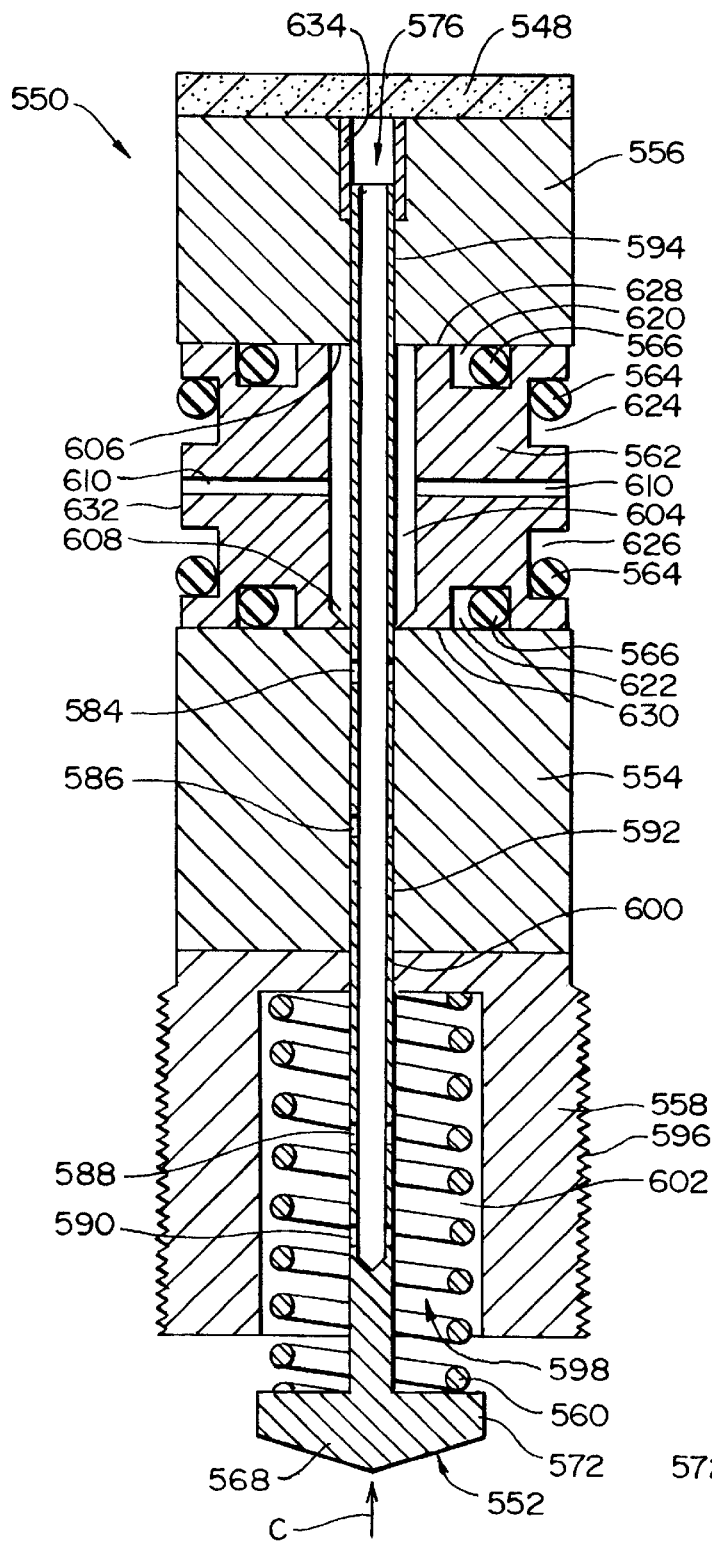
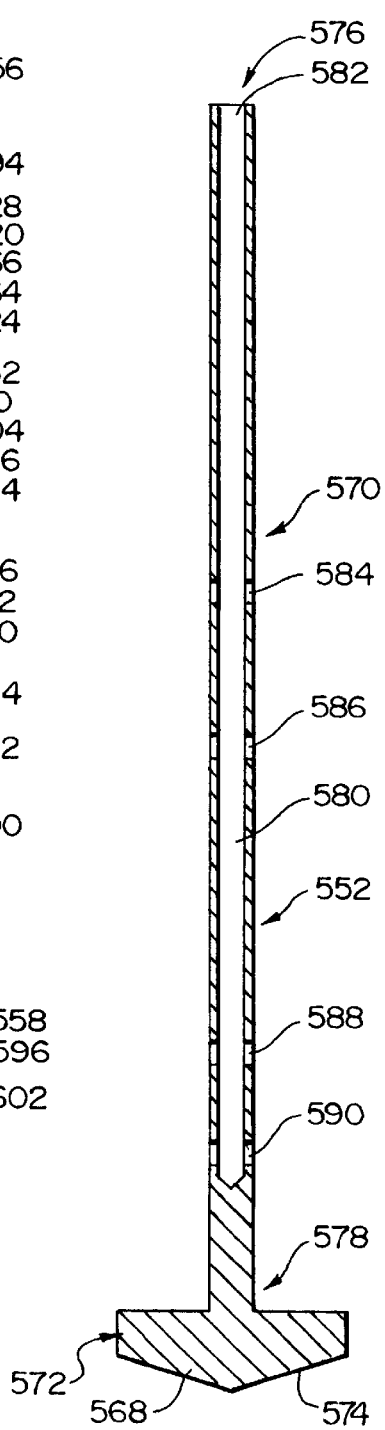
FIG. 6A
FIG. 6B

HIGH PRESSURE REGULATED FLOW CONTROLLER

RELATED APPLICATIONS

This application claims priority of U.S. Provisional Patent Application Ser. No. 60/087,521 filed Jun. 1, 1998.

TECHNICAL FIELD

The present invention relates to systems and methods for controlling the flow of pressurized fluid and, more specifically, to such systems and methods that allow precise control of flow of fluid from a source having high, variable, and/or unknown pressure.

BACKGROUND OF THE INVENTION

In many disciplines, a pressurized fluid must be supplied in precise quantities. Usually, the quantity of fluid supplied is controlled by regulating the flow of the fluid. Fluid flow is independent of conduit size, supply pressure, and the like, and controlling the flow rate ensures that a precise quantity of the fluid is delivered where required.

The present invention is of particular significance when used to control the flow of gasses at relatively low flow rates and will be described in detail below in that context. But the present invention may have application to other fluids such as liquids and to relatively large flow rates. The scope of the present invention should thus be determined with reference to the claims appended hereto and not the following detailed description.

One example where the quantity of a gas supplied must be precisely controlled is the delivery of a gas to a medical patient. In this context, a gas is mixed with air supplied to the patient through a ventilator to obtain a desired effect. If too little gas is supplied to the patient, the desired effect may not be obtained. On the other hand, too much gas may be toxic to the patient. Other examples where precise quantities of gas must be supplied include scientific and medical testing, industrial processing, and scuba diving.

A primary impediment to maintaining a constant flow of gas is that the pressure at which the gas is supplied may be unknown or variable. Often, the source of the pressurized gas is a pressurized tank or compressor. The pressure of the fluid supplied by either of these sources can fluctuate significantly. For example, as the quantity of gas within a pressurized tank decreases, the pressure of the fluid flowing from the tank will decrease. Accordingly, in many systems in which the flow of a gas is important, the flow rate must be measured and monitored and the system adjusted as necessary to maintain the flow rate within predetermined limits.

RELATED ART

U.S. Pat. No. 4,015,626 issued to the present Applicant discloses a valve assembly for maintaining constant flow rates. This valve assembly comprises a housing that defines upstream and downstream chambers, a movable wall assembly arranged between these chambers, a spring located in the downstream chamber that acts on the movable wall, a bicycle valve located in the upstream chamber such that its control stem engages the movable wall, and coiled high resistance tubing connected between the chambers. Changes in the pressure in the downstream chamber allow the movable wall to move and operate the bicycle valve control stem to open or close the bicycle valve to control the flow of fluid flowing through the valve assembly. The spring may be adjusted to obtain different flow rates. The tubing functions as a pressure reducing restriction and to average the flow rate of fluid passing therethrough.

The valve assembly disclosed in the '626 patent is relatively complex and expensive to manufacture. Also, the pressure drop through the high resistance tubing plays an important role in determining the range of flow rates that may be obtained. Altering the pressure drop through the tubing to obtain different flow rate ranges would be difficult because different tubing (i.e., change of length or passageway size) must be used. The length of the high resistance tubing supplied renders the system relatively large and increases the likelihood of failure. And this valve assembly is designed to operate only at relatively low (80 to 150) psi.

The need thus exists for systems and methods for supplying fluids, and in particular gasses, at constant flow rate.

OBJECTS OF THE INVENTION

From the foregoing, it should be clear that a primary object of the present invention is to provide improved systems and methods for maintaining a constant flow rate of a fluid such as a gas.

Another more specific object of the present invention is to provide flow rate controlling systems and methods having a favorable mix of the following characteristics:

Maintains the flow rate at a target flow rate or within a relatively narrow range including the target flow rate;

Allows the target flow rate to be adjusted;

Can accommodate or be adapted to accommodate input pressures of up to 5000 psi; and Can be easily and inexpensively manufactured.

BRIEF DESCRIPTION OF THE DRAWINGS

FIG. 4 is a section view of a high pressure regulator assembly of the third embodiment depicted in FIG. 3;

FIG. 6 is a section view of a high pressure regulator assembly of the fourth embodiment depicted in FIG. 5.

DETAILED DESCRIPTION OF THE PREFERRED EMBODIMENTS

First Embodiment

Figure 1:
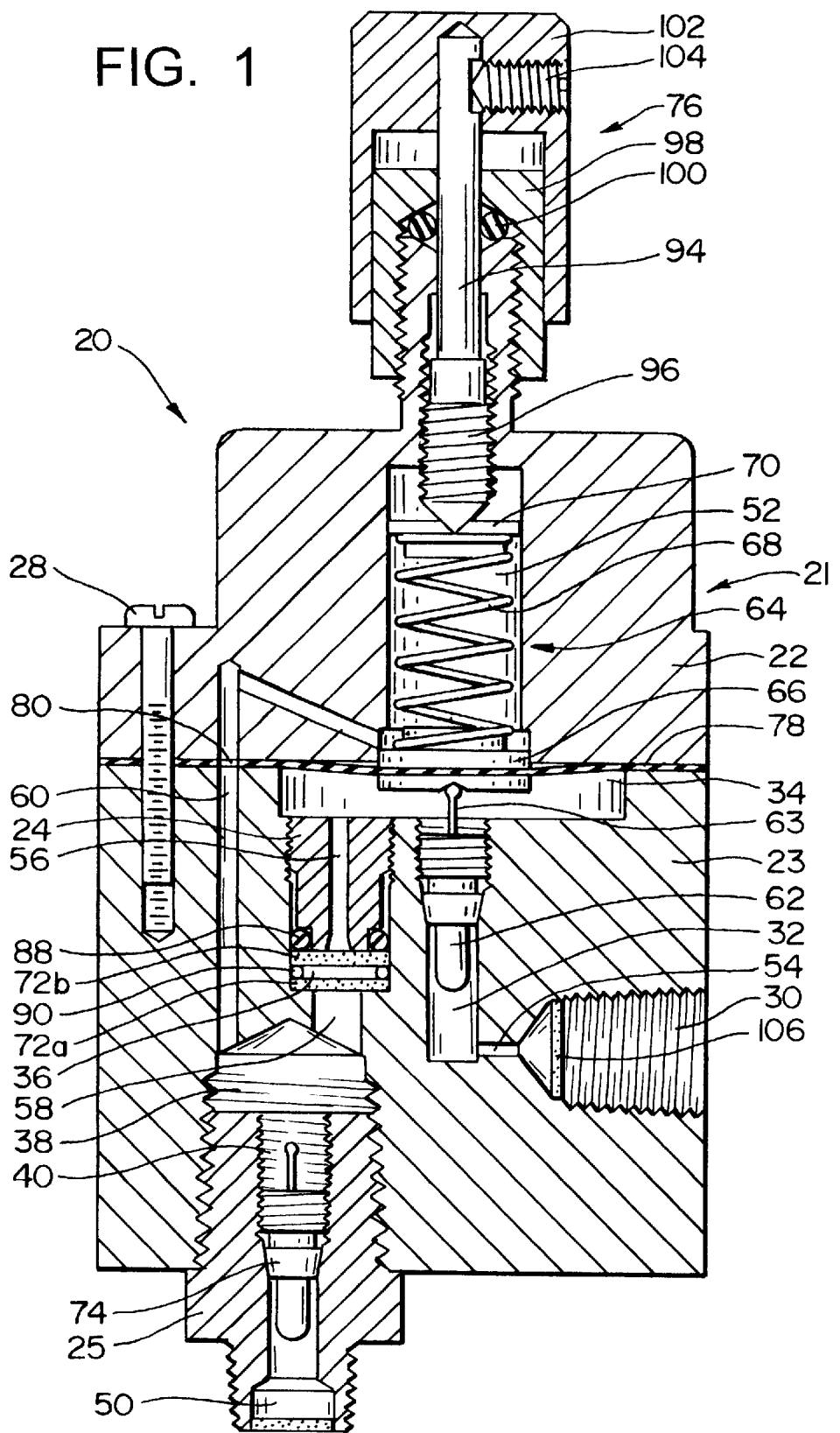
FIG. 1 is a section view of a first embodiment of a flow controller constructed in accordance with, and embodying, the principles of the present invention.

Referring now to FIG. 1 of the drawing, depicted therein at 20 is a flow controller constructed in accordance with, and embodying, the principles of the present invention. The flow controller 20 of the first embodiment may be manufactured very inexpensively and is designed to operate reliably in a range of approximately 0 to 200 psi.

The exemplary flow controller 20 comprises a housing 21 comprising a first portion 22, a second portion 23, a retaining member 24, and an outlet member 25. The first and second housing portions 24 and 26 are fastened together by one or more screws such as a screw 28. The retaining member 24 and outlet member 25 are threadingly attached to the second housing portion 23 as will be described in further detail below.

The housing 22 defines a series of interconnected chambers: an inlet chamber is shown at 30; a first valve chamber is shown at 32; a piston chamber is shown at 34; a filter chamber is shown at 36; a sampling chamber is shown at 38; a second valve chamber is shown at 40; an outlet chamber is shown at 50; and a spring chamber is shown at 52. The inlet chamber 30 is connected to the first valve chamber 32 by an inlet passageway 34.

The first valve chamber 32 opens directly into the piston chamber 34. The piston chamber 34 is in fluid communication with the filter chamber 36 by a filter passageway 56. The filter chamber 36 is in fluid communication with the sampling chamber 38 through a sampling passageway 58. The sampling chamber 38 is in fluid communication with the spring chamber 52 through a feedback passageway 60. The sampling chamber 38 directly opens into the second valve chamber 40, and the second valve chamber 40 directly opens into the outlet chamber 50.

Broadly speaking, fluid, the flow of which is to be regulated, is directed into the inlet passageway 30. The fluid entering the inlet chamber 30 will be referred to herein as the unregulated fluid. Fluid exits the controller 20 through an outlet chamber 50. The flow of the fluid flowing out of the outlet chamber 50 is regulated and controlled, and this will be referred to as the regulated fluid.

Mounted within the first valve chamber 54 is a first valve assembly 62. The first valve assembly comprises an actuator rod 63. Depressing the actuator rod 63 causes the valve assembly to open, with the size of the opening being proportional to the amount that the actuator rod 63 is depressed. The exemplary first valve assembly 63 is a bicycle valve that are easily available in the marketplace and are normally used in bicycle tires.

Mounted within the piston chamber 34 and spring chamber 52 is a piston assembly 54 comprising a piston head 56, spring 68, and adjustment plate 70.

Mounted within the filter chamber 36 are a plurality of filters 72 arranged such that fluid passing between the passageways 56 and 58 must pass through the filters 72. In the exemplary flow controller 20, two filters 72a and 72b are provided. These filters 72a and 72b are porous filter discs that are employed primarily for the purpose of creating a predetermined pressure drop in the fluid flowing therethrough.

More specifically, these filters are commonly available in the marketplace from a number of sources for filtering air, water, and other fluids. Such filters are manufactured by heating and compressing granules of materials such as ceramics, stainless steel, titanium, and similar materials. The resulting structure defines a series of interconnected passageways that can function as a particulate filter for removing particles of from 0.01 to 1.00 microns.

In the context of the present invention, these filters each result in a drop of 4 psi, for a total pressure drop of between 10 and 14 psi. The flow rate of the exemplary controller 20 can be adjusted using one or more of the filters 72 to obtain flow rates of between approximately 5–250 cc per minute, as will be described in further detail below.

Mounted within the second valve chamber 40 is a second valve assembly 74. The second valve assembly 74 is arranged such that it functions as a check valve, allowing fluid flow only from the second valve chamber 40 into the outlet chamber 50.

Shown at 76 in FIG. 1 is an adjustment assembly that allows the location of the adjustment plate 70 to be moved relative to the housing 22.

A diaphragm 78 is arranged between the housing portions 24 and 26 such that it passes through the piston chamber 34. An opening 80 is provided in the diaphragm 78 to allow fluid to flow through the feedback passageway 60. The diaphragm 78 further is engaged with the piston 66. Fluid may thus not flow from the piston chamber 34 directly into the spring chamber 52 around the piston 66. The diaphragm 78 also prevents fluid from flowing out of the system between the two housing portions 24 and 26.

The spring 68 is arranged between the adjustment plate 70 and the piston 66. The actuator rod 63 of the first valve assembly 62 engages the piston 66 to maintain the spring 68 in compression.

Operating the adjustment assembly 76 causes the adjustment plate 70 to move upward or downward to decrease or increase the compression on the spring 68.

The filter passageway 56 is defined by the retaining member 24, which is mounted within the filter chamber 36. This retaining member 24 threadingly engages the walls of the housing portion 26 that define the chamber 36 to hold the filters 72a and 72b in position. Additionally, O-rings 88 and 90 are provided to prevent flow of fluid between the retaining member 24 and the housing portion 23.

In operation then, depressing the rod 63 downward causes the valve assembly 62 to open and thus allow unregulated fluid to flow from the inlet chamber 30 into the piston chamber 34. This fluid thus passes through the valve passageway 56 and the filter member 72a and 72b into the sampling chamber 38. A known pressure drop is introduced across the filters 72a and 72b.

The sampling chamber 38 is in fluid communication with the spring chamber 52 through the feedback passageway 60 such that the pressure in these chambers 38 and 52 is equalized. The pressure in the spring chamber 52 acts on the back of the piston 66 in the same direction as the spring 68. The feedback passageway 60 thus forms a feedback path which exerts a force on the piston 66 that will increase or decrease as necessary to operate the valve assembly 62 and thus regulate the flow of fluid from the inlet chamber 30 to the outlet chamber 50.

The flow of fluid through of fluid through the controller 20 is controlled by two mechanisms. First, one, two, or more filters 72 may be provided to allow course adjustment of the flow of fluid through the system 20. These filters may be inserted and removed by detaching the housing portions 22 and 23 from each other and removing the retaining member 24. As discussed above, these filters can be employed to adjust the flow rate in increments of approximately 25–100 cc per minute, depending upon the particular fluid.

Second, the adjustment assembly 76 may be operated to obtain fine adjustment of the fluid flow. Thus, once a given number of filter discs 72 are mounted within the filter chamber 36 as described above to get near the desired flow rate, the adjustment assembly 76 is operated to obtain exactly the desired flow rate.

The controller 20 thus accurately controls and regulates the flow of fluid therethrough.

The exemplary flow controller 20 is shown and described herein is of a prototype that is machined out of metal. This design may be easily adapted to allow the housing 22 and other members to be injection molded in mass quantities. For example, the axis of the inlet chamber 30 may be made the same as that of the sampling chamber 38 to simplify the mold necessary to injection mold the housing portion 26.

In the exemplary flow controller 20, the second valve chamber 40 and outlet chamber 50 are formed in the outlet member 25; the outlet member 25 is in turn threadingly received in the sampling chamber 38.

The adjustment assembly 76 comprises a rod 94 having a threaded end 96 adapted to engage threaded interior walls of the housing portion 24. By axially rotating the rod 94, the rod 94 can be moved up and down relative to the housing 22. The rod 94 engages the adjustment plate 70 such that upward and downward movement of the rod 94 is translated to the plate 70.

The rod extends through a retaining cap 98 that threadingly engages the housing portion 24 to hold an O-ring 100 in place. The O-ring 100 prevents fluid from escaping from the spring chamber 52 around the rod 94. A knob member 102 is attached to the rod 94 by a set screw 104 to facilitate rotation of the rod 94 about its axis.

A filter 106 may be inserted into the inlet chamber 30 to filter out any material within the unregulated fluid that may clog the filters 72 or otherwise interfere with proper operation of the controller 20.

Second Embodiment

Figure 2:
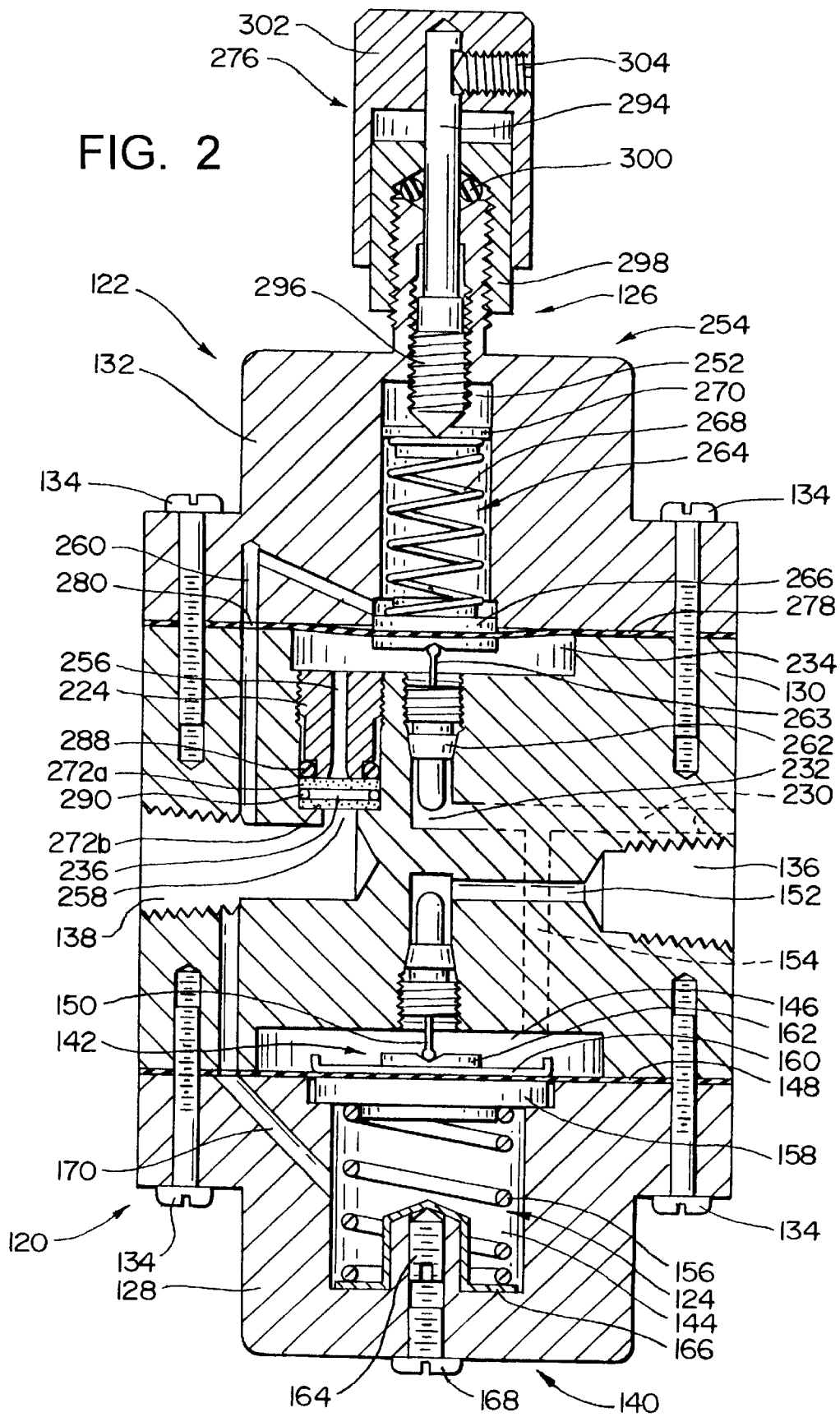
FIG. 2 is a section view of a second embodiment of a flow controller constructed in accordance with, and embodying, the principles of the present invention.

Referring to FIG. 2, depicted therein at 120 is a flow controller constructed in accordance with, and embodying, the principles of the present invention. This flow controller 120 is adapted to maintain a flow rate of a gas within a predetermined range about a target flow rate and can accommodate input pressures of up to approximately 300 psi.

The exemplary flow controller 120 comprises a housing assembly 122, a pressure regulator assembly 124, and a flow regulator assembly 126.

The housing assembly 122 comprises first, second, and third housing portions 128, 130, and 132. These portions 128–132 are connected by screws 134 such that the housing assembly 122 defines a number of internal chambers and passageways as will be described in detail below.

As shown in FIG. 2, an inlet port 136 and outlet port or sampling chamber 138 are formed in the central portion 130 of the housing assembly 122. The port 136 is threaded to receive conventional connectors and hoses that allow fluid from a high pressure source (not shown) to enter the controller 120 at the inlet port 136. The outlet port 138 is similarly threaded such that it may be connected to a device (not shown) that requires a precisely regulated flow of fluid.

The pressure regulator assembly 124 comprises a pressure adjustment assembly 140 and a pressure valve assembly 142.

The first portion 128 of the housing assembly 122 defines a pressure adjustment cavity 144, while the second portion 130 of the housing 122 defines a pressure regulation cavity 146. When the first and second portions of the housing assembly 122 are joined together, the adjustment cavity 144 and regulation cavity 146 oppose each other. Fluid is not allowed to flow directly between these cavities 144 and 146, however. Instead, a first annular seal membrane 148 is arranged between the first and second housing portions 128 and 130 such that this membrane 148 prevents fluid flow between these cavities 144 and 146.

The valve assembly 142 comprises an actuator rod 150 that, when moved to the left in FIG. 2, gradually opens the valve assembly 142. The actuator rod 150 is spring biased towards the right in FIG. 2 into a closed position in which fluid cannot flow through the valve assembly 142. Fluid flowing through the inlet 136 enters an inlet passageway 152 and then passes through the valve assembly 142 when the actuator rod 150 is moved to the left to allow fluid flow through the valve assembly 142. The fluid flowing through the valve assembly 142 then enters the regulator cavity 146 and into a connecting passageway 154. The destination of the fluid flowing through the connecting passageway 154 will be described in further detail below.

FIG. 2 shows that the adjusting assembly 140 comprises a spring member 156 that is mounted within the adjusting cavity 144. The spring member 156 acts on an adjustment plate 158 that is in contact with the membrane 148. The membrane 148 is flexible so that it can move to the left and right in FIG. 2 within a limited range of movement without tearing. Located on the other side of the membrane 148 from the adjustment plate 158 is a valve seat plate 160. This valve seat plate 160 comprises a seat portion 162 adapted to engage the actuator rod 150.

FIG. 2 also shows that the adjustment assembly 140 comprises an adjustment set screw 164, a spring seat member 166 and a cover screw 168. By removing the cover screw 168, the adjustment set screw 164 may be rotated to change the position of the spring seat member 166 relative to the valve assembly 142. This spring seat member 166 may thus be moved using the set screw 164 to change the biasing force applied by the spring member 156 against the adjustment plate 158.

The adjustment assembly 140 may thus be used to apply a predetermined opening force on the actuator member 150. In addition, fluid flowing into the regulator chamber 146 will act on the adjustment plate 158 through the membrane 148 such that, as this pressure in the chamber 146 increases, the valve assembly 142 begins to close. Then, as the pressure within the chamber 146 decreases, this spring will act on the actuator rod 150 through the membrane 148 to open the valve assembly 142 and thus allow fluid to enter the chamber 146. Fluid flows into the adjustment chamber 144 from the outlet port 138 through a return passageway 170 so that the pressure of the fluid at the outlet port 138 acts on the back of the adjustment plate 158 and thus also will tend to affect the location of the actuator rod 150 and thus the amount that the valve assembly 142 is opened.

The purpose of this pressure regulator assembly 124 is thus to ensure that fluctuations in pressure at the input port do not affect the flow rate at the output port 138.

Referring now to the flow regulator assembly 126, it can be seen that this comprises a retaining member 224 that is threadingly attached to the second housing portion 130 as will be described in further detail below.

The housing 122 defines another series of interconnected chambers: an inlet chamber is shown at 230; a first valve chamber is shown at 232; a piston chamber is shown at 234; a filter chamber is shown at 236; the outlet port or sampling chamber is shown at 138; and a spring chamber is shown at 252. The inlet chamber 230 is connected to the first valve chamber 232 by the connecting passageway 154.

The first valve chamber 232 opens directly into the piston chamber 234. The piston chamber 234 is in fluid communication with the filter chamber 236 by a filter passageway 256. The filter chamber 236 is in fluid communication with the outlet port 138 through a sampling passageway 258. The outlet port or sampling chamber 138 is in fluid communication with the spring chamber 252 through a feedback passageway 260.

Broadly speaking, fluid, the flow of which is to be regulated, is directed from the connecting passageway 154 into the inlet chamber 230. The fluid entering the inlet chamber 230 is pressure regulated. Fluid exits the controller 120 through an outlet port or chamber 138. The flow of the fluid flowing out of the outlet chamber 138 is regulated and controlled, and this will be referred to as the flow regulated fluid.

Mounted within the first valve chamber 232 is a first valve assembly 262. The first valve assembly 262 comprises an actuator rod 263. Depressing the actuator rod 263 causes the valve assembly to open, and, as with the valve assembly 242 described above, the size of the opening in the valve assembly 262 is proportional to the amount that the actuator rod 263 is depressed.

Mounted within the piston chamber 234 and spring chamber 252 is a piston assembly 264 comprising a piston head 266, spring 268, and adjustment plate 270.

Mounted within the filter chamber 236 are a plurality of filters 272 arranged such that fluid passing between the passageways 256 and 258 must pass through the filters 272. In the exemplary flow controller 220, two filters 272a and 272b are provided. These filters 272a and 272b are porous filter discs that are employed primarily for the purpose of creating a predetermined pressure drop in the fluid flowing therethrough.

More specifically, these filters are commonly available in the marketplace from a number of sources for filtering air, water, and other fluids. Such filters are manufactured by heating and compressing granules of materials such as ceramics, stainless steel, titanium, and similar materials. The resulting structure defines a series of interconnected passageways that can function as a particulate filter for removing particles of from 0.01 to 1.00 microns.

In the context of the present invention, these filters each result in a drop of 4 psi, for a total pressure drop of between 10 and 14 psi. The flow rate of the exemplary controller 120 can be adjusted using one or more of the filters 272 to obtain flow rates of between approximately 5–250 cc per minute, as will be described in further detail below.

Shown at 276 in FIG. 2 is an adjustment assembly that allows the location of the adjustment plate 270 to be moved relative to the housing 122.

A diaphragm 278 is arranged between the housing portions 130 and 132 such that it passes through the piston chamber 234. An opening 280 is provided in the diaphragm 278 to allow fluid to flow through the feedback passageway 260. The diaphragm 278 further is engaged with the piston 266. Fluid may thus not flow from the piston chamber 234 directly into the spring chamber 252 around the piston 266. The diaphragm 278 also prevents fluid from flowing out of the system between the two housing portions 228 and 230.

The spring 268 is arranged between the adjustment plate 270 and the piston 266. The actuator rod 263 of the first valve assembly 262 engages the piston 266 to maintain the spring 268 in compression.

Operating the adjustment assembly 276 causes the adjustment plate 270 to move left or right in FIG. 2 to decrease or increase the compression on the spring 268.

The filter passageway 256 is defined by the retaining member 224, which is mounted within the filter chamber 236. This retaining member 224 threadingly engages the walls of the housing portion 130 that define the chamber 236 to hold the filters 272a and 272b in position. Additionally, O-rings 288 and 290 are provided to prevent flow of fluid between the retaining member 224 and the housing portion 130.

In operation then, depressing the rod 263 towards the valve assembly 262 causes the valve assembly 262 to open and thus allow fluid to flow from the inlet chamber 230 into the piston chamber 234. This fluid thus passes through the valve passageway 256 and the filter members 272a and 272b into the sampling chamber 138. A predetermined, known pressure drop is introduced across the filters 172a and 172b.

The outlet port or sampling chamber 138 is in fluid communication with the spring chamber 252 through the feedback passageway 260 such that the pressure in these chambers 238 and 252 is equalized. The pressure in the spring chamber 252 acts on the back of the piston 266 in the same direction as the spring 268. The feedback passageway 260 thus forms a feedback path which exerts a force on the piston 266 that will increase or decrease as necessary to operate the valve assembly 162 and thus regulate the flow of fluid from the inlet chamber 230 to the outlet port 138.

The flow of fluid through of fluid through the controller 120 is first pressure regulated by the pressure regulator assembly 124 and then the flow rate is controlled by two mechanisms of the flow regulator 126.

First, one, two, or more filters 272 may be provided to allow course adjustment of the flow of fluid through the system 120. These filters may be inserted and removed by detaching the housing portions 130 and 132 from each other and removing the retaining member 224. As discussed above, these filters can be employed to adjust the flow rate in increments of approximately 25–100 cc per minute, depending upon the particular fluid.

Second, the adjustment assembly 276 may be operated to obtain fine adjustment of the fluid flow. Thus, once a given number of filter discs 272 are mounted within the filter chamber 236 as described above to get near the desired flow rate, the adjustment assembly 276 is operated to obtain exactly the desired flow rate.

The controller 120 thus accurately controls and regulates the flow of fluid therethrough.

The exemplary flow controller 120 is shown and described herein may be easily adapted to allow the housing assembly 122 and other members to be injection molded in mass quantities.

The adjustment assembly 276 comprises a rod 294 having a threaded end 296 adapted to engage threaded interior walls of the housing portion 132. By axially rotating the rod 294, the rod 294 can be moved relative to the housing 122. The rod 294 engages the adjustment plate 270 such that movement of the rod 294 is translated to the plate 270.

The rod extends through a retaining cap 298 that threadingly engages the housing portion 132 to hold an 0-ring 300 in place. The O-ring 300 prevents fluid from escaping from the spring chamber 252 around the rod 294. A knob member 302 is attached to the rod 294 by a set screw 304 to facilitate rotation of the rod 294 about its axis.

A filter may be inserted into the inlet chamber to filter out any material within the unregulated fluid that may clog the filters 272 or otherwise interfere with proper operation of the controller 120.

Third Embodiment

Figure 3:
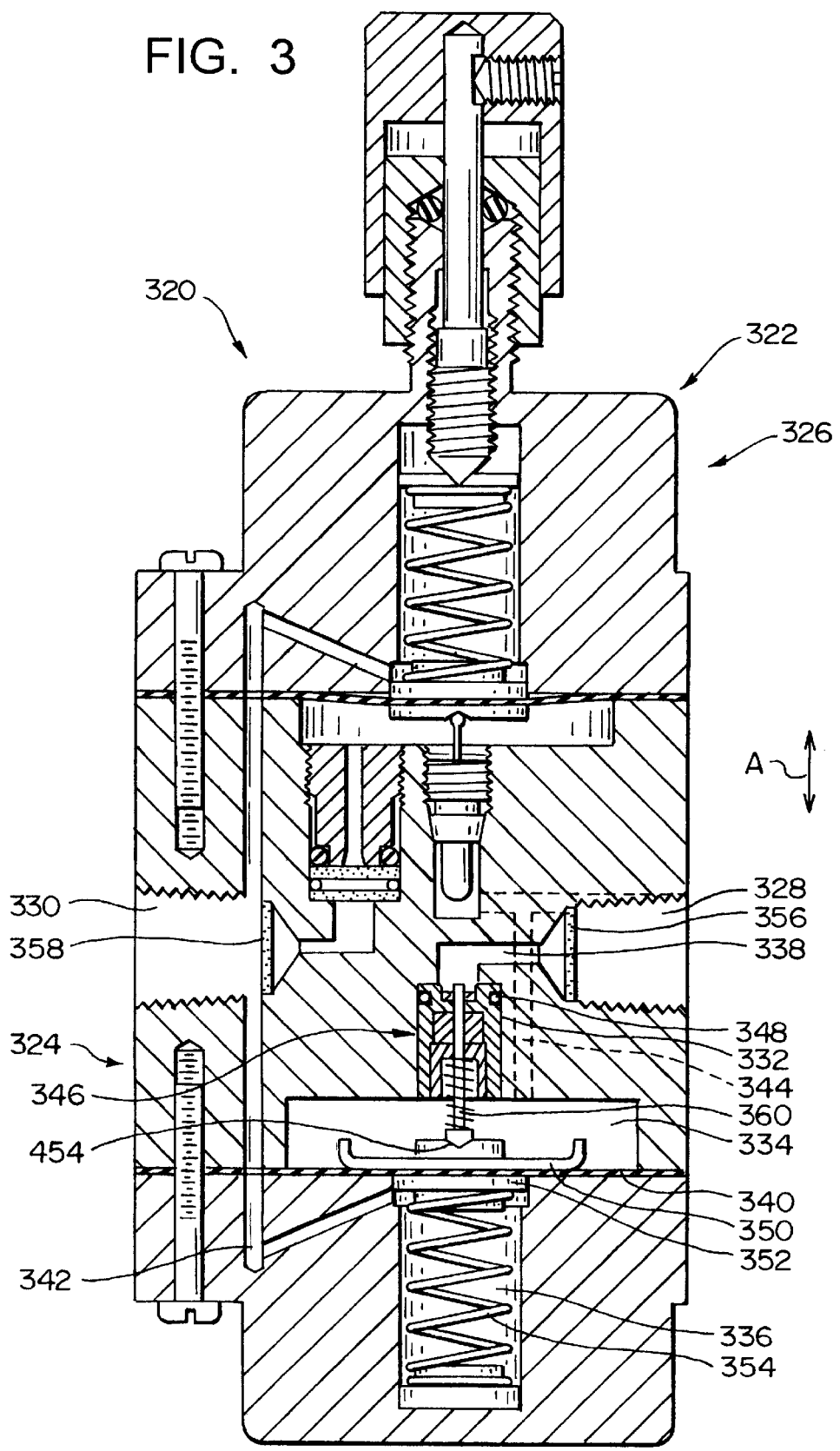
FIG. 3 is a section view of a third embodiment of a flow controller constructed in accordance with, and embodying, the principles of the present invention.

Referring now to FIG. 3, depicted at 320 therein is yet another exemplary flow controller constructed in accordance with, and embodying, the principles of the present invention. The flow controller 320 comprises a housing assembly 322, a pressure regulation stage 324, and a flow regulation stage 326.

The primary difference between the flow controller 320 and the flow controller 120 described above is that the pressure regulation stage 324 can handle input pressures up to approximately 2000 psi. The housing assembly 322 and flow regulation stage 326 of the flow controller 320 are constructed and operate in the same manner as the housing assembly 122 and flow regulation stage 126 of the flow controller 120 described above. These assemblies 322 and 326 thus will not be discussed in detail below beyond what is necessary for a complete understanding of the operation of the pressure regulation stage 324.

The housing assembly 322 defines an inlet port 328, an outlet port 330, a valve chamber 332, a piston chamber 334, and a spring chamber 336. The inlet port 328 is in fluid communication with the valve chamber 332 through an inlet passageway 338. The valve chamber 332 is in direct fluid communication with the piston chamber 334. The valve chamber 332 is sealed from the spring chamber 336 by a resilient, flexible seal membrane 340. The spring chamber 336 is in fluid communication with the outlet port 330 by a pressure feedback passageway 342. The piston chamber 334 is in fluid communication with a connecting passageway 344 that, like the connecting passageway 154 described above, allows fluid to flow from the pressure regulation stage 324 into the flow regulation stage 326.

Mounted within the valve chamber 332 and extending into the piston chamber 334 is a valve assembly 346 and an o-ring 348. Arranged within the piston chamber 334 is a piston plate 350. Arranged within the spring chamber 336 is a pressure plate 352 and a spring 354. Filters 356 and 358 are displaced within the inlet port 328 and outlet port 330, respectively.

The valve assembly 346 and o-ring 348 are secured within the valve chamber 332 such that fluid may flow from the inlet port 328 to the piston chamber 334 only by passing through the valve assembly 346. A valve stem 360 of the valve assembly 346 projects into the piston chamber 334 and, as will be described in detail below, engages the piston plate 350 such that the piston plate 350 is held against the seal membrane 340. The spring 354 engages the pressure plate 352 such that the pressure plate 352 is held against the seal membrane 340 on the opposite side as the piston plate 350.

Accordingly, depending upon the pressures within the piston chamber 334 and the spring chamber 336, the piston plate 350 and pressure plate 352 will act on each other through the membrane 340 in the directions shown by arrow A in FIG. 3. The piston plate 350 will in turn act on the valve stem 360 and, as will be explained in further detail below, result in movement of the valve stem 360 in the directions shown by arrow A.

A comparison of FIGS. 2 and 3 indicates that another difference between the flow controller 120 and the flow controller 320 is that the flow controller 320 does not contain an adjustment assembly such as the adjustment assembly 140 described above. To the contrary, the flow controller 120 may be constructed without the adjustment assembly 140 and still operate effectively in most situations.

In particular, the Applicant has discovered that, by appropriate selection of the spring 156 of the controller 120 or the spring 354 of the controller 320, the pressure within the piston chambers 124 and 334 can be maintained at approximately 30 psi (i.e., 30±10 psi). This intermediate pressure within the piston chamber allows the system not only to handle a wide range of input pressures but also a fairly wide range of back pressure at the outlet port and still provide constant fluid flow.

Referring now to FIGS. 4A and 4B, depicted therein is an enlarged view of the valve assembly 346 described above. The valve assembly 346 comprises the valve stem 360, a valve body 362, a bearing member 364, a valve spring 366, and a spring seat 368.

The exemplary valve stem 360 is a valve stem 360 is an assembly comprising a stem member 370, a retaining washer 372, a stem cap 374, and a valve seat 376.

As perhaps best shown in FIG. 4B, the stem member 370 comprises a shaft portion 378 and a head portion 380. The stem portion 378 is a hollow cylinder defining an interior chamber 382 and having first and second ends 384 and 386. The head portion 380 is formed on the second end 386. An end opening 388 is formed in the first end 384 of the shaft portion 378. An series of inlet openings 390 is formed in the shaft portion 378 approximately one-fifth of the way from the shaft first end 384 to the shaft second end 386. A series of outlet openings 392 are formed in the shaft portion 378 approximately one-fifth of the way from the shaft second end 386 to the shaft first end 384. The head portion 380 has a cylindrical portion 394 and a conical portion 396.

The shaft portion 378 of the stem member 370 has an inner diameter of approximately 0.019" and an outer diameter of approximately 0.031. The cylindrical portion 394 has a diameter of approximately 0.03102 and thus is just slightly larger than the stem member outer diameter.

Four inlet openings 390 are spaced in 900 increments about the shaft portion 378. The outlet openings 392 are formed in three groups of four, where the groups are evenly spaced along the shaft 378 and the openings 392 in each group are also spaced in 90° increments about the shaft portion 378. The minimum diameters of the exemplary openings 390 and 392 are approximately 0.001".

The stem cap 374 comprises a reduced diameter portion 398 and an increased diameter portion 400. The reduced diameter portion 398 is sized and dimensioned to snugly receive the first end 384 of the stem member shaft portion 378. The valve seat 376 is an annular member defining a hole 402 having a diameter that is approximately the same as, or slightly smaller than, that of the stem member shaft portion 378. The increased diameter portion 400 is sized and dimensioned to receive the valve seat 376. The valve seat 376 is a resilient material that functions as a seal as will be described in further detail below.

The bearing member 364 is a cylindrical block of material that is hollowed out to define an internal cylindrical bearing surface 404. The diameter of the bearing surface 404 is approximately the same as that of the stem member shaft portion 378.

The valve housing 362 is generally cylindrical and defines a through hole 420 comprising a valve seat portion 422, an inlet portion 424, an intermediate portion 426, and an outlet portion 428. The valve seat portion 422 is cylindrical and has a diameter that is slightly larger than that of the increased diameter portion 400 of the valve cap 374. The inlet portion has a diameter that is slightly larger than that of the valve stem shaft portion 378. The intermediate portion 426 is sized and dimensioned to snugly receive the bearing member 364; in this case, the exemplary intermediate portion 426 is cylindrical and has a diameter that is approximately the same as the outer diameter of the bearing member 364. The outlet portion 428 is defined at least in part by a threaded interior wall 430 of the valve housing 362. For ease of manufacturing, all of the through hole portions 422–428 are generally cylindrical.

An annular valve projection 432 extends from an inner wall of the housing member 362 into the through hole valve seat portion 422. An annular abutment projection 434 extends from an inner wall of the housing member 362 into the through hole inlet portion 424. An annular o-ring groove 436 is formed on an outer wall 438

The spring seat 368 is a generally cylindrical member having a threaded portion 440 and a retaining portion 442 and defining a seat through hole 444. The seat through hole 444 comprises a narrow portion 446 and a wide portion 448. The narrow portion 446 is cylindrical and has a diameter of slightly larger than that of the stem portion 378. The wide portion 448 is sized and dimensioned to receive a portion of the spring 366. The retaining portion 442 of the spring seat 368 is cylindrical and has a diameter that is approximately the same as the outer diameter of the bearing member 364.

An external surface 450 of the threaded portion 440 is threaded to mate with the threaded interior wall 430 of the valve housing 362.

The valve assembly 346 is assembled as follows. The bearing member 364 is initially placed into the intermediate portion 426 of the housing through hole 420. The spring seat 366 is then attached to the housing member 362 with the threaded portion 440 engaging the valve housing threaded interior wall 430. So attached, the retaining portion 442 extends a short distance into the intermediate chamber 426 of the housing through hole 420 and contacts the bearing member 364. The stem portion 378 of the stem member 370 is then inserted through the stem washer 372 such that the washer 372 abuts the stem member head portion 380.

The valve spring 366 is a helical compression spring, and the stem portion 378 of the stem member 370 is next inserted through the spring 366 until the spring contacts the stem washer 372.

The stem portion 378 is next inserted through the spring seat through hole 444, the bearing member 364, and the valve housing through hole inlet portion 424 such that the first end 384 of the stem portion 378 is within the valve seat portion 422 of the valve housing through hole 420.

The valve seat 376 is then placed within the increased diameter portion 400 of the stem cap 374. The stem cap 374 and valve seat 376 are then placed into the valve seat portion 422 of the valve housing through hole 420 such that the first end 384 of the stem member shaft portion 378 extends through the hole 402 in the valve seat 376 and into the reduced diameter portion 398 of the stem cap 374. The compressible valve seat 376 will frictionally hold the valve cap 374 onto the first end 384 of the stem member shaft portion 378. An adhesive may be used to enhance the attachment between the valve cap 374 and the stem member 370.

With the valve cap 374 fully engaged on the stem member 370, the valve spring 366 will be slightly compressed and will apply a biasing force on the stem member head portion 380 through the stem washer 372.

As long as no other loads are applied to the stem member 370, the biasing force applied by the valve spring 366 will force the valve seat 376 against the valve projection 432 on the valve housing 362. The valve assembly 346 is in a closed configuration when the valve seat 376 is held against the valve projection 432. Additionally, when the valve assembly 346 is in its closed configuration, the inlet openings 390 in the stem member 370 are located within the intermediate portion 426 of the valve housing through hole 420 and thus are covered by the bearing member 364. The outlet openings 392 are unobstructed at all times.

When a control force is applied to the valve stem 360 as shown by arrow B in FIG. 4A, the control force will compress the valve spring 366, which allows the stem member 370 to move such that the valve seat 376 is disengaged from the valve projection 432. Application of such a control force places the valve assembly 346 into an open configuration.

When the valve assembly 346 is in its open configuration, fluid may flow from the valve seat portion 422 of the valve housing through hole 420 to the outlet portion 428 thereof. In particular, the exemplary bearing member 364 is made of a relatively inflexible Teflon material that is primarily designed to support the valve stem 360 for reciprocating movement in the directions shown by arrow A in FIGS. 3 and 4A. The bearing member 364 does not form a seal around the valve stem member shaft portion 378. Accordingly, fluid may flow from the valve seat portion 422 of the valve housing through hole 420 to the outlet portion 428 thereof through a small gap between the shaft portion 378 and the bearing member 364. When the fluid reaches the inlet openings 390, fluid may additionally reach the outlet portion 428 through the interior chamber 382 and outlet openings 392.

When the valve assembly 346 is barely opened, the effective cross-sectional area through which fluid must pass from the valve through hole valve seat portion 422 to the valve through hole outlet portion 428 is very small. As stronger control forces are applied, the valve stem 360 is displaced further in the direction shown by arrow B until the inlet openings 390 are in direct communication with the inlet portion 424 of the through hole 420. Accordingly, the valve assembly 346 becomes more open when greater control forces are applied thereto.

The outer surface 438 of the valve housing 362 is threaded as shown at 452 to allow the entire valve assembly 346 to be mounted to the housing assembly 322. The o-ring 348 is received within the o-ring groove 436 when the valve assembly 346 is secured to the housing assembly 322. When the system 20 is fully assembled, the conical portion 396 of the valve stem member 370 engages a similar shaped conical depression 454 in the piston plate 350.

The valve assembly 436 can be made in the same form factor as the bicycle valve assembly 142 described above and works in substantially the same way. The piston plate 350 will move back and forth in the directions shown by arrow A in FIGS. 3 and 4A depending upon the pressures within the piston chamber 334 and spring chamber 336. This movement of the piston plate 350 causes the valve stem 360 to move; as the valve stem 360 moves, more or less fluid is allowed to flow through the valve assembly 436 as necessary to compensate for fluctuations in input pressure. The valve assembly 436 differs from the bicycle valve assembly 142 in that the valve assembly 436 provides a positive fluid shut off and is effective at much higher input pressures than is a conventional bicycle valve assembly.

Fourth Embodiment

Figure 5:
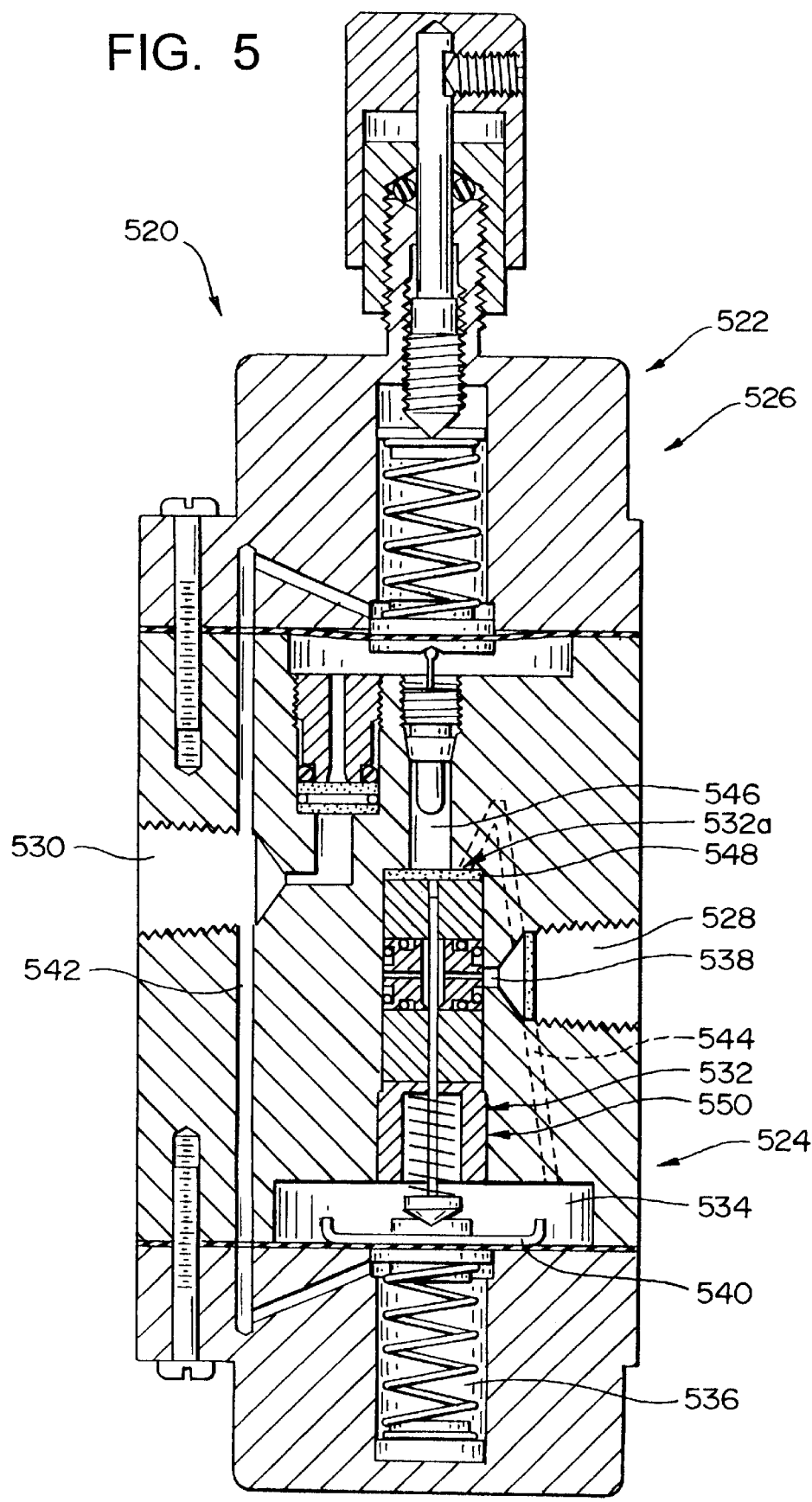
FIG. 5 is a section view of a fourth embodiment of a flow controller constructed in accordance with, and embodying, the principles of the present invention.

Referring now to FIG. 5, depicted at 520 therein is yet another exemplary flow controller constructed in accordance with, and embodying, the principles of the present invention. The flow controller 520 comprises a housing assembly 522, a pressure regulation stage 524, and a flows regulation stage 526.

The primary difference between the flow controller 520 and the flow controllers 120 and 320 described above is that the pressure regulation stage 524 can handle input pressures up to approximately 5000 psi. Unlike the pressure regulation stage 324 described above, however, the pressure regulation stage 524 does not allow positive shut off of fluid flowing through this assembly 524.

The housing assembly 522 and flow regulation stage 526 of the flow controller 520 are constructed and operate in the same basic manner as the housing assemblies 122 and 322 and flow regulation stages 126 and 326 of the flow controllers 120 and 320 described above. These assemblies 522 and 526 thus will not be discussed in detail below beyond what is necessary for a complete understanding of the operation of the pressure regulation stage 524.

The housing assembly 522 defines an inlet port 528, an outlet port 530, a pressure valve chamber 532, a piston chamber 534, and a spring chamber 536. The inlet port 528 is in fluid communication with the pressure valve chamber 532 through an inlet passageway 538. The pressure valve chamber 532 is in direct fluid communication with the piston chamber 534. The valve chamber 532 is sealed from the spring chamber 536 by a resilient, flexible seal membrane 540. The spring chamber 536 is in fluid communication with the outlet port 530 by a pressure feedback passageway 542.

The piston chamber 334 is in fluid communication with a connecting passageway 544. The housing assembly 522 differs from the housing assembly 322 described above in that an interior end 532a of the valve chamber 532 is in direct communication with a first valve chamber 546 of the flow regulation stage 526. And unlike the connecting passageways 154 and 344 described above, the connecting passageway does not allow fluid to flow directly from the pressure regulation stage 524 into the flow regulating stage 526. Instead, the connecting passageway 544 terminates at the interior end 532a of the valve chamber 532.

Placed in the interior end 532a of the valve chamber 532 is a filter element 548 that restricts fluid flow from the pressure valve chamber 532 into the first valve chamber 546.

Mounted within the valve chamber 532 and extending into the piston chamber 534 is a valve assembly 550. The valve assembly 550 is depicted in further detail in FIGS. 6A and 6B.

The valve assembly 550 comprises a valve stem member 552, first and second support members 554 and 556, a retaining member 558, a valve spring 560, an inlet member 562, and first and second pairs 564 and 566 of o-rings.

The valve stem member 552 comprises a head 568 and a shaft 570. The head 568 comprises a cylindrical portion 572 and a conical portion 574. The shaft 570 comprises first and second ends 576 and 578 and defines an interior chamber 580. An opening 582 is formed at the first end 576 and allows fluid communication into and out of the interior chamber 580. First and second sets 584 and 586 of inlet openings and first and second sets of outlet openings 588 and 590 are formed in the shaft 570; these inlet and outlet openings also allow fluid communication into and out of the interior chamber 580. The head 568 is formed on the second end 578 of the shaft 570.

The bearing members 554 and 556 are annular members defining through holes 592 and 594. The outer diameters of the annular members 556 and 556 are the same, and the exemplary through holes 592 and 594 are cylindrical and have substantially the same diameter. The first bearing member 554 is slightly longer than the second bearing member 556.

The retaining member 558 is a generally cylindrical member having a threaded outer surface 596 and defining a through hole 598. The through hole 598 has a narrow portion 600 and a wide portion 602. These through hole portions 600 and 602 are substantially cylindrical. The diameter of the narrow portion 600 is substantially the same as or slightly larger than those of the bearing member through holes 592 and 594.

The valve spring 560 is a helical compression spring sized and dimensioned to substantially fit within the wide portion 602 of the retaining member through hole 598.

The inlet member 562 is a substantially cylindrical member defining an inlet chamber 604. The inlet chamber 604 is generally cylindrical and terminates in first and second inlet openings 606 and 608. A plurality feed passageways 610 are formed in the inlet member 562 that radially extend from the inlet chamber 604 to the exterior of the inlet member 562.

First through fourth annular grooves 620, 622, 624, and 626 are formed in the inlet member 562. The first and second annular grooves 620 and 622 are formed in end surfaces 628 and 630 of the inlet member 562. The third and fourth annular grooves 624 and 626 are formed in an outer surface 632 of the inlet member 562. The first set 564 of o-rings are arranged in the grooves 624 and 626, while the second set 566 of o-rings are arranged in the grooves 620 and 622.

To form the valve assembly 550, the second support member 556 is first placed into the valve chamber 532 such that the support member 556 abuts the filter element 548. The inlet member 562 is then placed into the valve chamber 532 with the sets 564 and 566 of o-rings in place within the grooves 620–628 and the inlet chamber first end 606 adjacent to the second support member 556. The first support member 554 is then placed in the valve chamber 532. The retaining member 558 is then threaded into the valve chamber such that the narrow portion 600 in the retaining member through hole 598 is adjacent to the first support member 554 and the second support member 556 is securely held against the filter element 548. The valve spring is then placed into the wide portion 602 of the retaining member through hole.

Finally, the valve stem 552 is inserted through the retaining member through hole 598 such that the stem shaft 570 extends through the through hole 592 in the first support member 554, through the inlet chamber 604 in the inlet member 562, and partially into the through hole 594 in the second support member 556. A sleeve 634 may be placed into the through hole 594 of the second support member 556 to alleviate wear on the support member 556 by the first end 576 of the stem shaft 570.

The valve assembly 550 operates basically as follows. High pressure fluids entering the inlet port 528 flow through the inlet passageway 538 and the feed passageways 610 into the inlet chamber 604. Pressurized fluid in the inlet chamber 604 can flow through a number of different paths into the first valve chamber 546 of the flow rate regulation stage 526.

For example, a portion of the fluid within the inlet chamber 604 fluid will flow between the stem member shaft 570 and the second support member 556, through the filter element 548, and into the first valve chamber 546. Another portion of the pressurized fluid within the inlet chamber 604 will flow between the stem member shaft 570 and the first support member 554. This fluid will flow into the stem interior chamber 580 through the inlet openings 584 and 586 and then either out of the outlet openings 588 and 590 or the opening 582 in the stem shaft 570.

When greater flow through the valve assembly 550 is required, the a control force will be applied to the valve stem 552 as shown by arrow C in FIG. 6A to place the first set of inlet openings 584 in direct fluid communication with the inlet chamber 604.

The total flow through the valve assembly 550 thus varies from a small, constant flow and can be increased depending upon demand. The valve assembly 550, unlike the valve assembly 346 described above, can never be completely shut off. However, the high pressure at the inlet port 528 acts neutrally on the valve stem 552 and thus will not interfere with the movement of the valve stem 552 along its axis. Accordingly, very high input pressures may be used without interfering with the ability of the control force to move the valve stem 552 along its axis and thus open and close the valve assembly 550 as required by demand and variations in input pressures.

General Considerations

In the foregoing embodiments, certain of the components have been described as they are used in the examples given. The properties of many of these components can be changed depending upon the circumstances to "tune" the flow controllers for a particular use.

For example, the various springs used, interior chambers defined by the valve stems, and inlet and outlet openings in the valve stems must be selected based on the type of fluid, expected inlet pressures, and desired flow rates.

In addition, the materials used for the various components must be selected based on the pressures and types of fluids expected. For example, for air at low pressures, plastic may be used for many of the components. For caustic fluids and higher pressures, steel or stainless steel may be used.

Accordingly, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

I claim:

1. A flow controller having an inlet port and an outlet port, where the flow controller supplies a substantially constant, predetermined flow of fluid out of the outlet port, the flow controller comprising:

housing means defining the inlet port, the outlet port, and an intermediate chamber;

first stage means for allowing fluid to flow from the inlet port to the intermediate chamber, where the first stage means maintains a predetermined pressure differential between the inlet port and the outlet port based on an outlet pressure of the fluid at the outlet port;

second stage means for allowing fluid to flow from the intermediate port to the outlet port, the second stage means comprising a flow valve assembly comprising a flow valve stem, where the flow valve assembly is arranged to allow fluid to flow from the intermediate chamber to the outlet port, the flow valve assembly is operable between a closed configuration and a fully open configuration by applying a flow control force to the flow valve stem, and between the closed configuration and the fully open configuration, the total flow of fluid through the flow valve assembly varies with the magnitude of the flow control force applied to the flow valve stem, and flow feedback means for applying the flow control force to the flow valve stem based on an output pressure of the fluid at the outlet port; and at least one flow restriction element arranged between the intermediate chamber and the outlet port downstream of the flow valve assembly, where the at least one flow restriction element comprises a porous body that creates a predetermined pressure differential between the intermediate chamber and the outlet port.

2. A flow controller as recited in claim 1, in which the first stage means comprises:

a pressure valve assembly comprising a pressure valve stem, where the pressure valve assembly is arranged to allow fluid to flow from the inlet port to the intermediate chamber, the pressure valve assembly is operable between a closed configuration and a fully open configuration by applying a pressure control force to the pressure valve stem, and between the closed configuration and the fully open configuration, the total flow of fluid through the pressure valve assembly varies with the magnitude of the pressure control force applied to the pressure valve stem; and pressure feedback means for applying the pressure control force to the pressure valve stem based on an output pressure of the fluid at the outlet port.

3. A flow controller as recited in claim 2, in which the pressure valve assembly comprises:

a first bearing member defining a first bearing through hole;

the flow valve stem comprises a stem member defining a stem interior chamber and having at least one inlet hole and at least one outlet hole formed therein, where the stem member is disposed at least partly within the bearing through hole, and a valve spring arranged to bias the stem member out of the first bearing through hole; wherein the pressure valve assembly is arranged within the housing means such that fluid passing from the inlet port to the intermediate chamber must pass through at least one of the following paths between the stem means and the bearing means, through the inlet hole, through the stem interior chamber, out of the outlet hole, and into the intermediate chamber, and through the inlet hole, through the stem interior chamber, out of the outlet hole, and into the intermediate chamber.

4. A flow controller as recited in claim 3, in which the pressure valve assembly further comprises:

a valve housing member defining a housing through hole and on which is formed a valve portion, where the first bearing member is disposed within the housing through hole;

a valve seat arranged on the end of the stem means adjacent to the valve portion of the housing member; wherein fluid flowing from the inlet port to the intermediate chamber passes through the housing through hole; and the pressure valve assembly is operable between a closed configuration in which the valve seat engages the valve portion and fluid is substantially prevented from flowing through the housing through hole and an open configuration in which the valve seat does not engage the valve portion and fluid is allowed to flow through the housing through hole.

5. A flow controller as recited in claim 4, in which the valve housing member is threaded onto the housing means, the flow controller further comprising a spring seat member threaded into the housing through hole to hold the first bearing member within the valve housing member.

6. A flow controller as recited in claim 5, in which the spring seat member defines a spring seat through hole, where the stem means further extends through the spring seat through hole.

7. A flow controller as recited in claim 3, in which the pressure valve assembly further comprises:

a second bearing member defining a second bearing through hole; and a valve housing member defining an inlet chamber and an inlet passageway that allows fluid communication between the inlet port and the inlet chamber, where the valve housing member is disposed within the housing means between the first and second bearing members; wherein the stem member extends completely through the first bearing through hole and at least partly through the second bearing through hole; and the pressure valve assembly is arranged within the housing means such that fluid passing from the inlet port to the intermediate chamber must pass through at least one of the following paths through the first bearing through hole between the stem means and the first bearing means, through at least one of the inlet holes, through the stem interior chamber, out of at least one of the outlet holes, and into the intermediate chamber, and through the second bearing through hole between the stem means and the second bearing means, through at least one of the inlet holes, through the stem interior chamber, out of at least one of the outlet holes, and into the intermediate chamber.

8. A flow controller as recited in claim 1, in which the pressure feedback means comprises:

a pressure spring chamber defined by the housing means;

a pressure feedback passageway for allowing fluid communication between the outlet port and the pressure spring chamber;

a pressure plate arranged within the flow spring chamber;

a flow spring arranged to apply a flow biasing force on the flow pressure plate;

a flexible membrane arranged between the flow spring chamber and the intermediate chamber; and a piston member arranged within the intermediate chamber; wherein the pressure spring acts on the pressure plate;

the pressure plate acts on the piston member through the flexible membrane; and the piston member acts on the pressure valve stem to apply the pressure control force thereon.

9. A flow controller as recited in claim 3, in which the pressure feedback means comprises:

a pressure spring chamber defined by the housing means;

a pressure feedback passageway for allowing fluid communication between the outlet port and the pressure spring chamber;

a pressure plate arranged within the flow spring chamber;

a flow spring arranged to apply a flow biasing force on the flow pressure plate;

a flexible membrane arranged between the flow spring chamber and the intermediate chamber; and a piston member arranged within the intermediate chamber; wherein the pressure spring acts on the pressure plate;

the pressure plate acts on the piston member through the flexible membrane; and the piston member acts on the pressure valve stem member.

10. A flow controller as recited in claim 1, in which the housing means comprises at least two housing members fastened together.

11. A flow controller having an inlet port and an outlet port, where the flow controller supplies a substantially constant, predetermined flow of fluid out of the outlet port, the flow controller comprising:

housing means defining the inlet port, the outlet port, and an intermediate chamber;

first stage means for allowing fluid to flow from the inlet port to the intermediate chamber, the first stage means comprising a pressure valve assembly comprising a pressure valve stem, where the pressure valve assembly is arranged to allow fluid to flow from the inlet port to the intermediate chamber, the pressure valve assembly is operable between a closed configuration and a fully open configuration by applying a pressure control force to the pressure valve stem, and between the closed configuration and the fully open configuration, the total flow of fluid through the pressure valve assembly varies with the magnitude of the pressure control force applied to the pressure valve stem, and pressure feedback means for applying the pressure control force to the pressure valve stem based on an output pressure of the fluid at the outlet port;

second stage means for allowing fluid to flow from the intermediate port to the outlet port, the second stage means comprising a flow valve assembly comprising a flow valve stem, where the flow valve assembly is arranged to allow fluid to flow from the intermediate chamber to the outlet port, the flow valve assembly is operable between a closed configuration and a fully open configuration by applying a flow control force to the flow valve stem, and between the closed configuration and the fully open configuration, the total flow of fluid through the flow valve assembly varies with the magnitude of the flow control force applied to the flow valve stem, and flow feedback means for applying the flow control force to the flow valve stem based on the output pressure of the fluid at the outlet port; and at least one flow restriction element arranged between the intermediate chamber and the outlet port downstream of the flow valve assembly.

12. A flow controller as recited in claim 11, in which the pressure and flow valve assemblies are formed by bicycle valves.

13. A flow controller as recited in claim 11, in which the pressure valve assembly comprises:

a first bearing member defining a first bearing through hole;

the flow valve stem comprises a stem member defining a stem interior chamber and having at least one inlet hole and at least one outlet hole formed therein, where the stem member is disposed at least partly within the bearing through hole, and a valve spring arranged to bias the stem member out of the first bearing through hole; wherein the pressure valve assembly is arranged within the housing means such that fluid passing from the inlet port to the intermediate chamber must pass through at least one of the following paths between the stem means and the bearing means, through the inlet hole, through the stem interior chamber, out of the outlet hole, and into the intermediate chamber, and through the inlet hole, through the stem interior chamber, out of the outlet hole, and into the intermediate chamber.

14. A flow controller as recited in claim 13, in which the pressure valve assembly further comprises:

a valve housing member defining a housing through hole and on which is formed a valve portion, where the first bearing member is disposed within the housing through hole;

a valve seat arranged on the end of the stem means adjacent to the valve portion of the housing member; wherein fluid flowing from the inlet port to the intermediate chamber passes through the housing through hole; and the pressure valve assembly is operable between a closed configuration in which the valve seat engages the valve portion and fluid is substantially prevented from flowing through the housing through hole and an open configuration in which the valve seat does not engage the valve portion and fluid is allowed to flow through the housing through hole.

15. A flow controller as recited in claim 14, in which the valve housing member is threaded onto the housing means, the flow controller further comprising a spring seat member threaded into the housing through hole to hold the first bearing member within the valve housing member.

16. A flow controller as recited in claim 15, in which the spring seat member defines a spring seat through hole, where the stem means further extends through the spring seat through hole.

17. A flow controller as recited in claim 13, in which the pressure valve assembly further comprises:

a second bearing member defining a second bearing through hole; and a valve housing member defining an inlet chamber and an inlet passageway that allows fluid communication between the inlet port and the inlet chamber, where the valve housing member is disposed within the housing means between the first and second bearing members; wherein the stem member extends completely through the first bearing through hole and at least partly through the second bearing through hole; and the pressure valve assembly is arranged within the housing means such that fluid passing from the inlet port to the intermediate chamber must pass through at least one of the following paths
through the first bearing through hole between the stem means and the first bearing means, through at least one of the inlet holes, through the stem interior chamber, out of at least one of the outlet holes, and into the intermediate chamber, and
through the second bearing through hole between the stem means and the second bearing means, through at least one of the inlet holes, through the stem interior chamber, out of at least one of the outlet holes, and into the intermediate chamber.

18. A flow controller as recited in claim 11, in which the pressure feedback means comprises:

a pressure spring chamber defined by the housing means;

a pressure feedback passageway for allowing fluid communication between the outlet port and the pressure spring chamber;

a pressure plate arranged within the flow spring chamber;

a flow spring arranged to apply a flow biasing force on the flow pressure plate;

a flexible membrane arranged between the flow spring chamber and the intermediate chamber; and a piston member arranged within the intermediate chamber; wherein the pressure spring acts on the pressure plate;

the pressure plate acts on the piston member through the flexible membrane; and piston member acts on the pressure valve stem to apply the pressure control force thereon.

19. A flow controller as recited in claim 13, in which the pressure feedback means comprises:

a pressure spring chamber defined by the housing means;

a pressure feedback passageway for allowing fluid communication between the outlet port and the pressure spring chamber;

a pressure plate arranged within the flow spring chamber;

a flow spring arranged to apply a flow biasing force on the flow pressure plate;

a flexible membrane arranged between the flow spring chamber and the intermediate chamber; and a piston member arranged within the intermediate chamber; wherein the pressure spring acts on the pressure plate;

the pressure plate acts on the piston member through the flexible membrane; and the piston member acts on the pressure valve stem member.

20. A flow controller as recited in claim 11, in which the housing means comprises at least two housing members fastened together.

21. A method of supplying a substantially constant, predetermined flow of fluid comprising the steps of:

providing a housing means defining an inlet port, an outlet port, an intermediate chamber, an inlet passageway that allows fluid communication between the inlet port and the intermediate chamber, and an outlet passageway that allows fluid communication between the intermediate chamber and the outlet port;

arranging a pressure valve assembly comprising a pressure valve stem within the inlet passageway to prevent or allow fluid to flow from the inlet port to the intermediate chamber, where the pressure valve assembly operates between a closed configuration and a fully open configuration and the total flow of fluid through the pressure valve assembly varies with the magnitude of the pressure control force applied to the pressure valve stem;

arranging a flow valve assembly comprising a flow valve stem within the outlet passageway to prevent or allow fluid to flow from the intermediate chamber to the outlet port, where the flow valve assembly operates between a closed configuration and a fully open configuration and the total flow of fluid through the flow valve assembly varies with the magnitude of the flow control force applied to the flow valve stem;

applying the pressure control force to the flow valve stem based on an output pressure of the fluid at the outlet port;

applying the flow control force to the flow valve stem based on the output pressure of the fluid at the outlet port; and arranging at least one flow restriction element in the outlet passageway downstream of the flow valve assembly.

22. A flow controller having an inlet port and an outlet port, where the flow controller supplies a substantially constant, predetermined flow of fluid out of the outlet port, the flow controller comprising:

housing means defining the inlet port, the outlet port, and an intermediate chamber;

first stage means for allowing fluid to flow from the inlet port to the intermediate chamber, where the first stage means comprises
a pressure valve assembly comprising
a pressure valve stem, a first bearing member defining a first bearing through hole;

the flow valve stem comprises a stem member defining a stem interior chamber and having at least one inlet hole and at least one outlet hole formed therein, where the stem member is disposed at least partly within the bearing through hole, and a valve spring arranged to bias the stem member out of the first bearing through hole; wherein the pressure valve assembly is arranged within the housing means such that fluid passing from the inlet port to the intermediate chamber must pass through at least one of the following paths between the stem means and the bearing means, through the inlet hole, through the stem interior chamber, out of the outlet hole, and into the intermediate chamber, and through the inlet hole, through the stem interior chamber, out of the outlet hole, and into the intermediate chamber, the pressure valve assembly is arranged to allow fluid to flow from the inlet port to the intermediate chamber, the pressure valve assembly is operable between a closed configuration and a fully open configuration by applying a pressure control force to the pressure valve stem, and between the closed configuration and the fully open configuration, the total flow of fluid through the pressure valve assembly varies with the magnitude of the pressure control force applied to the pressure valve stem; and pressure feedback means for applying the pressure control force to the pressure valve stem based on an output pressure of the fluid at the outlet port;

second stage means for allowing fluid to flow from the intermediate port to the outlet port, the second stage means comprising a flow valve assembly comprising a flow valve stem, where the flow valve assembly is arranged to allow fluid to flow from the intermediate chamber to the outlet port, the flow valve assembly is operable between a closed configuration and a fully open configuration by applying a flow control force to the flow valve stem, and between the closed configuration and the fully open configuration, the total flow of fluid through the flow valve assembly varies with the magnitude of the flow control force applied to the flow valve stem, and flow feedback means for applying the flow control force to the flow valve stem based on an output pressure of the fluid at the outlet port; and at least one flow restriction element arranged between the intermediate chamber and the outlet port downstream of the flow valve assembly, where the at least one flow restriction element comprises a porous body that creates a predetermined pressure differential between the intermediate chamber and the outlet port.

23. A flow controller as recited in claim 22, in which the pressure valve assembly further comprises:

a valve housing member defining a housing through hole and on which is formed a valve portion, where the first bearing member is disposed within the housing through hole;

a valve seat arranged on the end of the stem means adjacent to the valve portion of the housing member; wherein fluid flowing from the inlet port to the intermediate chamber passes through the housing through hole; and the pressure valve assembly is operable between a closed configuration in which the valve seat engages the valve portion and fluid is substantially prevented from flowing through the housing through hole and an open configuration in which the valve seat does not engage the valve portion and fluid is allowed to flow through the housing through hole.

24. A flow controller as recited in claim 23, in which the valve housing member is threaded onto the housing means, the flow controller further comprising a spring seat member threaded into the housing through hole to hold the first bearing member within the valve housing member.

25. A flow controller as recited in claim 24, in which the spring seat member defines a spring seat through hole, where the stem means further extends through the spring seat through hole.

26. A flow controller as recited in claim 22, in which the pressure valve assembly further comprises:

a second bearing member defining a second bearing through hole; and a valve housing member defining an inlet chamber and an inlet passageway that allows fluid communication between the inlet port and the inlet chamber, where the valve housing member is disposed within the housing means between the first and second bearing members; wherein the stem member extends completely through the first bearing through hole and at least partly through the second bearing through hole; and the pressure valve assembly is arranged within the housing means such that fluid passing from the inlet port to the intermediate chamber must pass through at least one of the following paths through the first bearing through hole between the stem means and the first bearing means, through at least one of the inlet holes, through the stem interior chamber, out of at least one of the outlet holes, and into the intermediate chamber, and through the second bearing through hole between the stem means and the second bearing means, through at least one of the inlet holes, through the stem interior chamber, out of at least one of the outlet holes, and into the intermediate chamber.

27. A flow controller as recited in claim 22, in which the pressure feedback means comprises:

a pressure spring chamber defined by the housing means;

a pressure feedback passageway for allowing fluid communication between the outlet port and the pressure spring chamber;

a pressure plate arranged within the flow spring chamber;

a flow spring arranged to apply a flow biasing force on the flow pressure plate;

a flexible membrane arranged between the flow spring chamber and the intermediate chamber; and a piston member arranged within the intermediate chamber; wherein the pressure spring acts on the pressure plate;

the pressure plate acts on the piston member through the flexible membrane; and the piston member acts on the pressure valve stem member.

* * * * *